Aug. 29, 1950 W. C. ANDERSON 2,520,297
TILTOMETER SYSTEM
Filed Feb. 19, 1945 2 Sheets-Sheet 1
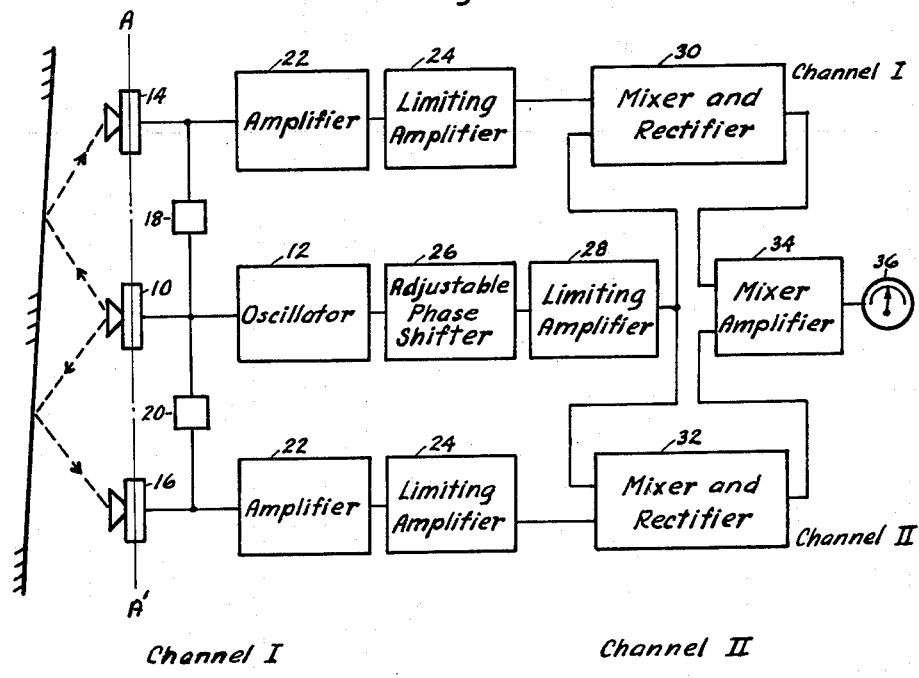
Fig. I
Fig. 2
Fig. 5
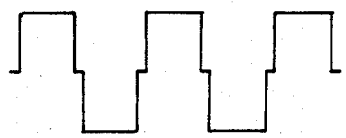
Fig. 3
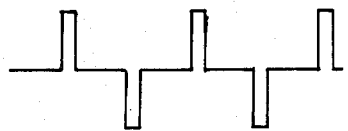
Fig. 6
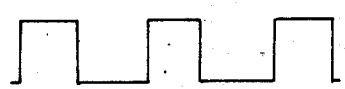
Fig. 4
Fig. 7
Inventor
Wilmer C. Anderson
By *SCBush*
Attorney Patented Aug. 29, 1950

2,520,297

UNITED STATES PATENT OFFICE 2,520,297

TILTOMETER SYSTEM

Wilmer C. Anderson, Douglaston, N. Y., assignor to the United States of America as represented by the Secretary of the Navy Application February 19, 1945, Serial No. 578,771

6 Claims. (Cl. 177—352)

This invention relates to tiltometer systems, and more particularly to tiltometer systems in which the tilt indication is varied in accordance with the height of the system above a reference surface.

It is often desirable to measure the relative tilt of a chosen dimension of a movable object and a reference surface in order to permit the object to be maintained parallel to the reference surface. A sonic tiltometer for this purpose is disclosed in copending application Serial No. 578,-772, filed February 19, 1945, Sonic Tiltometer, Donald G. C. Hare. In this tiltometer sound of either audible or inaudible frequency emanating from a projector mounted on a movable object is reflected from a reference surface and travels over different paths to two pickups symmetrically disposed in respect to the projector along the chosen dimension of the movable object. The transit times of the sound over the two available paths are compared to obtain a measure of tilt. In the description of this and other devices referred to herein, the terms "sound" and "sonic" are taken to refer to alternate compressions and rarefactions in air or other transmitting mediums and thus to include both audible and inaudible frequencies.

Sonic tiltometers of the type just described may be used in compensation of electromagnetic search-coil systems for spurious outputs due to relative tilt of the search coils and the earth's surface. In one system, a sonic tiltometer is arranged to produce an electrical signal in response to tilt which has the same form as the output signal of the search-coil system due to a like tilt, and the two output signals are combined in opposition and in proper proportions to eliminate spurious search-coil indications due to tilt. In many cases, however, the effect of tilt on the output indication of a search-coil system varies with the altitude or separation between the search-coils and the ground, the tilt effects being most pronounced at small separations and approaching zero at greater separations. Thus, if the usual sonic tiltometer were employed for compensation, the compensation might be too much at greater heights and insufficient at lower ones. The present tiltometer is intended to produce the desired variation in degree of compensation with height.

In order to overcome these difficulties, there is proposed a tiltometer for measuring the relative tilt of a chosen dimension of a movable object and a reference surface comprising a sonic projector mounted on the movable object, an oscillator for exciting the projector, a pair of sonic pickups symmetrically disposed in respect to this projector along the chosen dimension, means individual to each of these pickups for comparing the phase of the output thereof with that of a reference signal of known phase and of the same wave form to obtain a voltage proportional to the transit time of the sound from the projector reflected by the reference surface to that pickup, a balanced amplifier, and means whereby the voltages may be applied one to each side of the amplifier in such fashion that the gain of each side of the amplifier is determined by the transit time of the sound over the respective projector-pickup paths and the output voltage is a measure of the relative tilt of the chosen dimension of the movable object and the reference surface.

Accordingly, an object of the present invention is the provision of a tiltometer system in which the tilt indications vary in accordance with the height of the system above a reference surface.

Another object is to provide a tiltometer system having means for controlling the indications of the system in accordance with the height of the system above a reference surface.

A further object is to provide a tiltometer system having means for controlling the gain of an amplifier in accordance with the height of the system above a reference.

For a better understanding of the invention, reference is made to the accompanying drawing, in which:

Fig. 1 is a schematic diagram of a tiltometer system in accordance therewith.

Figs. 2 through 7, inclusive, are wave-form diagrams of the voltages appearing at various portions of the system of Fig. 1, these diagrams being drawn with a common time base.

Figure 8:
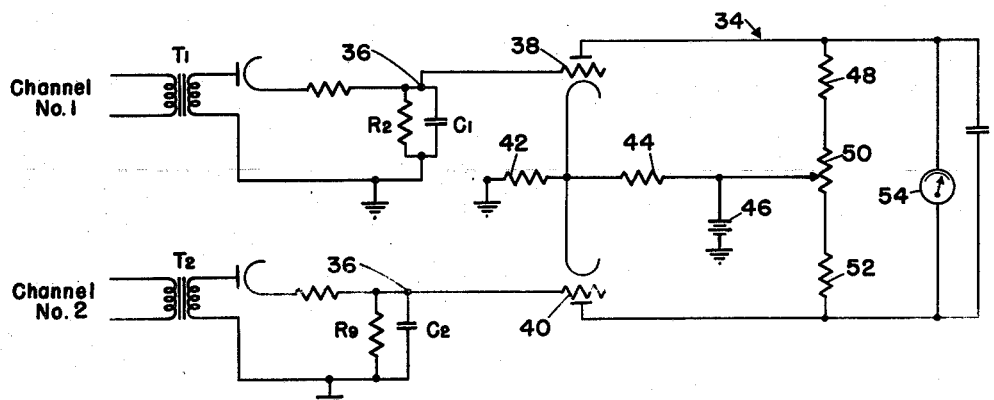
Fig. 8 illustrates one form of the mixer amplifier shown in Fig. 1.

In Fig. 1, the tiltometer system is shown as arranged to provide indications of the relative tilt of a dimension AA' of a movable object (not shown) and a reference surface, as for example the surface of the earth. A sonic projector 10 is mounted on the movable object and is excited by means of an oscillator 12. Sound energy from projector 10 reflected from the surface of the earth is picked up by a pair of pickup devices 14 and 16 symmetrically disposed in respect to the projector along dimension AA'. At audible frequencies, for example, sonic projector 10 and pickup devices 14 and 16 may be respectively a loudspeaker and a pair of microphones.

Phase networks 18 and 20 are arranged to permit addition of a portion of the drive voltage from oscillator 12 to the output voltages from pickups 14 and 16, thereby to cancel portions of the outputs of the pickups due to the direct waves from projector 10. The resultant pickup outputs are then due only to sounds reflected from the reference surface and are each shifted in phase relatively to the oscillator drive in accordance with the transit time of the sound over the respective projector-pickup paths. These pickup output voltages are applied to individual and identical channels, identified in Fig. 1 as channels I and II.

In each of channels 1 and 2 the output voltage of the appropriate pickup is applied to an amplifier 22 which raises its level. The amplified voltage is then applied to a limiting amplifier 24 to obtain square-wave signals which are independent of amplitude effects, but which have a phase determined by the sound transit time over the appropriate paths from projector to pickup.

A reference signal of known phase and square wave form is obtained by applying a portion of the output of oscillator 12 to an adjustable phase shifter 26 and a limiting amplifier 28, the gain of this system being such that the square waves of the reference signal have a constant amplitude equal to the amplitude of the signals in channels I and II. The signal at the output of the limiting amplifier of channel I is combined with a reference signal from limiting amplifier 28, and the combined signal is rectified by means of mixer-rectifier 30. Similarly, the signal at the output of the limiting amplifier of channel II is combined with the same reference signal and rectified in mixer-rectifier 32.

The two rectified signals thus obtained are applied respectively to the two sides of a balanced mixer-amplifier 34, and the output of this amplifier is applied to an indicator 36, as for example a milliammeter.

Considering the operation of the system, reference is made to Figs. 2 through 7, in which are shown the wave forms of voltages appearing at various points in the system, the phase of the reference voltage being chosen arbitrarily in such fashion that it leads the pickup signals at the inputs to mixer-rectifiers 30 and 32 by substantially 90 degrees when dimension AA' is parallel to the reference surface at the optimum working separation. Further consideration of the adjustment of reference-voltage phase will be given below. Thus in Fig. 2 the relationships of the input signals to mixer-rectifier 30 are illustrated. Here the reference signal from limiting amplifier 28 is shown by the solid line, while the sound signal from limiting amplifier 24 under the condition of tilt illustrated in Fig. 1 is indicated by the dashed line, the amplitude of the latter signal being slightly exaggerated for purposes of illustration. Fig. 3 shows the wave form of the resultant mixed voltage, and Fig. 4 shows the output of mixer-rectifier 30, this voltage being obtained by rectifying that shown in Fig. 3.

Figs. 5 through 7 are similar to Figs. 2 through 4, and show corresponding conditions existing in channel II under the same tilt conditions.

Assuming a tilt as shown in Fig. 1, pickup 14 is brought nearer the earth's surface, while pickup 16 is moved farther away therefrom. The transit time of the sound from projector 10 reflected to pickup 14 is thus decreased, while that of the sound reflected to pickup 16 is increased. As a result, the reference signal leads the pickup signal in channel II by an amount less than 90 degrees, while in channel II the reference signal leads the pickup signal by an amount correspondingly greater than 90 degrees.

It will be recognized, therefore, that reductions in transit time result generally in broadening of the series of square-wave pulses at the outputs of the mixer-rectifier units, while increases in transit time result in narrowing of the pulses at these points. Accordingly, when the tiltometer system is tilted in respect to the reference surface, one of the inputs to mixer-amplifier 34 comprises a series of relatively broad square-wave pulses, while the other comprises a series of relatively narrow square-wave pulses. The plate currents in the two sides of the mixer-amplifier are respectively measures of the transit times over the two paths and the difference between them is, therefore, a measure of relative tilt.

The variation in gain with height of the pickup can be accomplished in several ways, one such being shown in Fig. 8. At points 36 the rectified positive portions of the signals are applied to the respective grids of the two amplifier tubes 38 and 40 of mixer-amplifier 34.

The two tubes are biased near cut-off by means of the voltage divider 42 and 44, across the plate supply 46. Now with no signal input, and assuming matched tubes are used, the average D. C. output voltage across the resistors 48, 50 and 52, as measured by the D. C. meter, 54, is adjusted to zero by means of resistor 50. Now if equal signals are applied to the two grids, such as the signals that arise when there is no tilt, then there will be an equal decrease in negative bias on each tube due to the positive voltages across $R_2C_1$ and $R_9C_2$. Thus the gain of each tube rises, but the output difference voltage as measured by meter 54 still remains zero.

If a tilt is introduced, however, then there are no longer equal signals applied to the two grids, and there will be a difference in voltage in the plate loads of the two tubes and hence the meter will deflect. The greater the tilt, the greater will be this difference reading. Thus, it acts as a tiltometer in the normal fashion.

Figure 9:
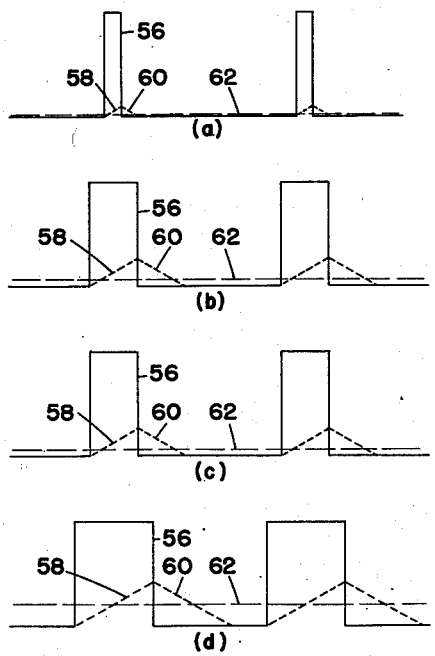
Figs. 9a to 9d are wave-form diagrams of the input and output of the amplifier of Fig. 8.

Figs. 9b and c represent crudely the case of equal signal voltages on the two grids for a given height. 56 is the rectified square wave voltage. 58 represents the voltage rise across the condensers $C_1$ and $C_2$ due to the charging, and 60 the fall in voltage due to discharge between pulses. The dashed line 62 represents the average plate current change resulting from this voltage on the grid. Thus, as shown in Figs. 9b and c the average plate current change is the same on each tube, and hence the meter will show no change with height for zero tilt.

Figs. 9a and b represent the case of tilt at one average height for the system, and Figs. 9c and d the same degree of tilt at a different height. Thus, it will be noticed that while the difference in width of the square waves in a and b, which represents the degree of tilt, is the same as in c and d, the total area under each square wave has changed due to the change in average height. It is this change in area that accounts for the change in average plate current as indicated. It will be noticed that the difference in average plate current 62 between a and b is no longer the same as that for c and d, although the tilt is the same. Thus, the change in height has produced a corresponding change in the tilt correction as indicated by the meter 54.

There are other ways of accomplishing this same net result, but the above is believed to be the simplest.

The way in which the resultant tilt output varies with separation may be altered as desired by varying the phase of the reference signal obtained from oscillator 12. If maximum tilt outputs are desired at small separations corresponding to optimum working heights for search-coil systems, adjustable phase shifter 26 may be adjusted substantially as described above; while if the inverse is desired, that is, maximum correction at large separations, the adjustable phase shifter may be adjusted accordingly. For this purpose, the reference signal from oscillator 12 may be so phased that it lags the pickup signals by substantially 90 degrees when dimension AA' of the movable object is parallel to the fixed surface at the chosen height. Other operating characteristics of the system may be obtained by appropriate variations in the phase of the reference signal.

What is believed to be new and useful is:

1. A tiltometer for measuring the relative tilt of a chosen dimension of a movable object and a reference surface comprising a sonic projector mounted on said movable object, an oscillator for exciting said projector, a pair of sonic pickups symmetrically disposed in respect to said projector along said chosen dimension, means individual to each of said pickups for comparing the phase of the output thereof with that of a reference signal of known phase and of the same wave form to obtain a voltage proportional to the transit time of the sound from the projector reflected by the reference surface to that pickup, a balanced amplifier, and means for applying said proportional voltage one to each side of the amplifier in such fashion that the gain of each side of the amplifier is determined by the transit time of the sound over the respective projector-pickup paths and the output voltage is a measure of the relative tilt of said chosen dimension of the movable object and said reference surface.

2. A tiltometer for measuring the relative tilt of a chosen dimension of a movable object and a reference surface comprising, a sonic projector mounted on said movable object, an oscillator for exciting said projector, a pair of sonic pickups symmetrically disposed in respect to said projector along said chosen dimension, means individual to each of said pickups for comparing the phase of the output thereof with that of a reference signal of known phase and of the same wave form to obtain a voltage proportional to the transit time of the sound from the projector reflected by the reference surface to that pickup, means for amplifying said voltages, a balanced amplifier, and means for applying said amplified voltage one to each side of the amplifier in such fashion that the gain of each side of the amplifier is determined by the transit time of the sound over the respective projector-pickup paths and the output voltage of said balanced amplifier is a measure of the relative tilt of said chosen dimension of the movable object and said reference surface.

3. A tiltometer for measuring the relative tilt of a chosen dimension of a movable object and a reference surface comprising, a sonic projector mounted on said movable object, an oscillator for exciting said projector, a pair of sonic pickups symmetrically disposed in respect to said projector along said chosen dimension, means individual to each of said pickups for comparing the phase of the output thereof with that of a reference signal of known phase and of the same wave form to obtain a voltage proportional to the transit time of the sound from the projector reflected by the reference surface to that pickup, means for amplifying said voltages, a balanced amplifier, means for applying said amplified voltage one to each side of the amplifier in such fashion that the gain of each side of the amplifier is determined by the transit time of the sound over the respective projector-pickup paths and the output voltage of said balanced amplifier is a measure of the relative tilt of said chosen dimension of the movable object and said reference surface, and means responsive to said output voltage to indicate the tilt.

4. A tiltometer for measuring the relative tilt of a chosen dimension of a movable object and a reference surface, said tiltometer comprising: a sonic projector mounted on said movable object; means for exciting said projector; a pair of sonic receivers symmetrically disposed with respect to said projector along said chosen dimension; means individual to each of said receivers for comparing the phase of the output thereof with that of a reference signal of known phase and of the same wave form to obtain a voltage proportional to the transit time of the sound from the projector reflected by the reference surface to that receiver; a balanced amplifier; and means for applying said proportional voltage one to each side of said amplifier to control the gain thereof whereby the output voltage of said amplifier is a measure of the relative tilt of said chosen dimension of the movable object and said reference surface.

5. A tiltometer for measuring the relative tilt of the chosen dimension of a movable object and a reference surface, said tiltometer comprising: a sonic projector mounted on said movable object; means for exciting said projector; a pair of sonic receivers symmetrically disposed with respect to said projector along said chosen dimension; means individual to each of said receivers for obtaining a voltage proportional to the transit time of the sound from the projector reflected by the reference surface to that receiver; a balanced amplifier; and means for applying said proportional voltage one to each side of said amplifier to control the gain thereof whereby the output voltage of said amplifier is a measure of the relative tilt of said chosen dimension of the movable object and said reference surface.

6. A tiltometer according to claim 5 and means for indicating said output voltage.

WILMER C. ANDERSON.

REFERENCES CITED

The following references are of record in the file of this patent:

UNITED STATES PATENTS

| Number | Name | Date |
|---|---|---|
| 1,636,502 | Fessenden | July 19, 1927 |
| 1,853,119 | Fessenden | Apr. 12, 1932 |
| 1,864,638 | Chilowsky | June 28, 1932 |
| 2,225,046 | Hunter | Dec. 17, 1942 |